M. EVERHART.
Machine for Storing the Power of Wind-Engines.
No. 205,255. Patented June 25, 1878.
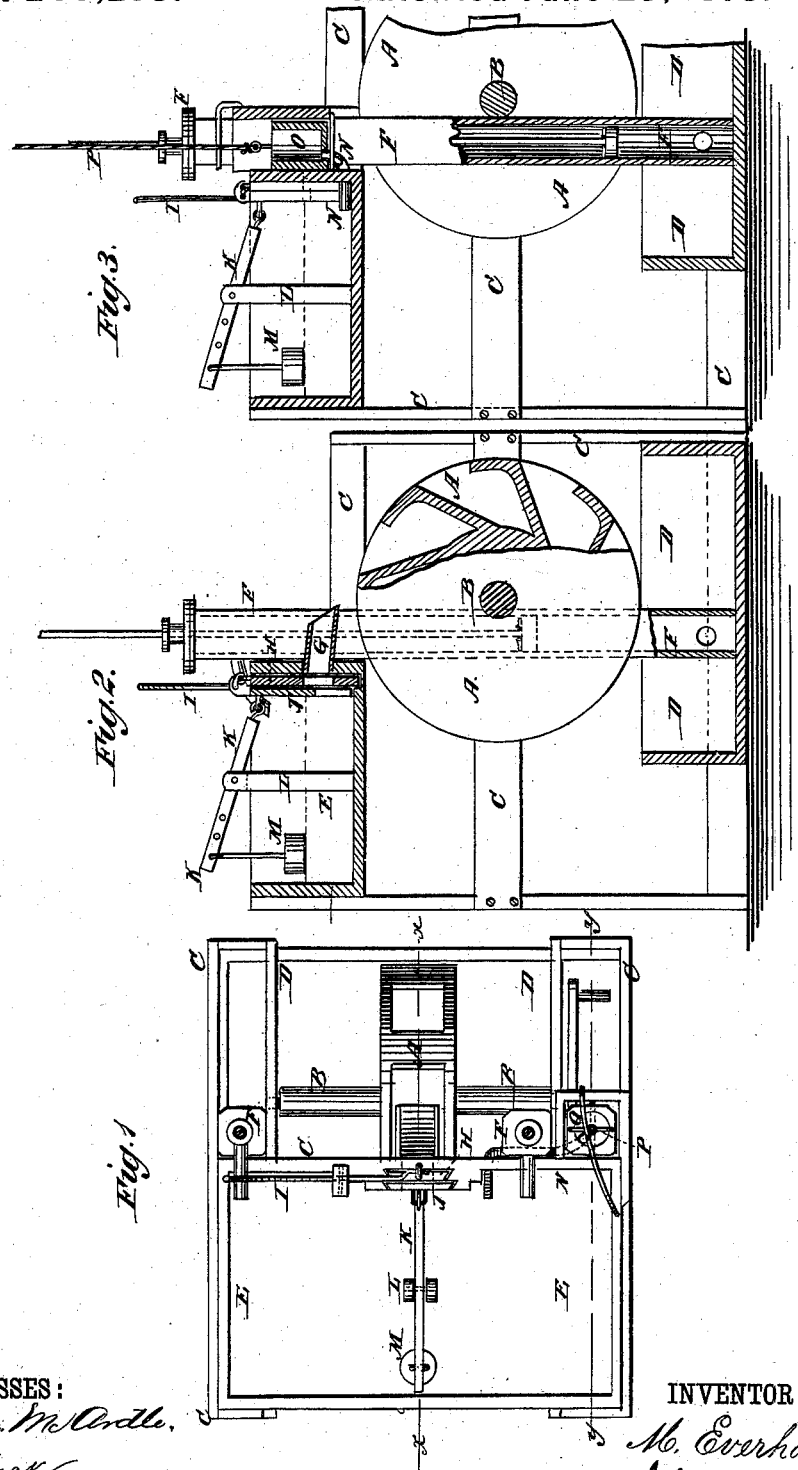
WITNESSES:
Francis McArdle
C. Sedgwick
INVENTOR:
M. Everhart
BY Munn & Co.
ATTORNEYS.
N. PETERS, PHOTO-LITHOGRAPHER, WASHINGTON, D. C.

UNITED STATES PATENT OFFICE.

MARTIN EVERHART, OF FORT WORTH, TEXAS.

IMPROVEMENT IN MACHINES FOR STORING THE POWER OF WIND-ENGINES.

Specification forming part of Letters Patent No. 205,255, dated June 25, 1878; application filed April 1, 1878.

*To all whom it may concern:*

Be it known that I, MARTIN EVERHART, of Fort Worth, in the county of Tarrant and State of Texas, have invented a new and useful Improvement in Water-Power, of which the following is a specification:

Figure 1 is a top view of my apparatus. Fig. 2 is a vertical section of the same, taken through the line $x$ $x$, Fig. 1. Fig. 3 is a vertical section of the same, taken through the line $y$ $y$, Fig. 1.

Similar letters of reference indicate corresponding parts.

The object of this invention is to furnish an improved water-power which shall be so constructed that the water may be stored up by the irregular action of the wind in such a way that it may be used for furnishing a continuous power, and which shall be simple in construction and not liable to get out of order or wear out.

A represents a water-wheel, which may be made in the form of an overshot wheel or a turbine, as may be desired, and which is attached to the shaft B. The shaft B revolves in bearings attached to the frame-work C, and from it power is taken to the machinery to be driven.

D is a tank, placed at a lower level than the wheel A, and in such a position as to receive the water from the said wheel. E is a tank, placed at such a height above the tank D and wheel A that the water may be discharged from it upon the said wheel A to give it motion. F are pumps, which are designed to be operated by an equal number of wind-wheels, which wind-wheels are not shown in the drawings. The pumps F are so arranged as to raise the water from the lower tank D and discharge it into the upper tank E, from which it flows through the spout G to the said wheel A. The discharge-opening of the tank E is provided with a gate, H, for closing off the outflowing water. To the top of the gate H is pivoted the end of a lever, I, which is pivoted to some suitable support at or above the top of the tank E. From the outer end of the lever I a rope is designed to hang in such a position that it may be conveniently reached and operated by an attendant to shut off or let on the water, when desired. The discharge-opening of the tank E is also provided with a sub-gate, J, working along the inner surface of the gate H, and so arranged as to partially close the said discharge-opening by moving downward. To the upper part of the gate J is pivoted the end of a lever, K, which is pivoted to a support, L, attached to the tank E. From the other end of the lever K is suspended a float, M, which is so arranged as to rest upon the bottom of the tank E when the discharge-opening is fully opened.

With this construction, as the water rises in the tank E, and by its weight discharges a greater volume, the float M rises and the gate J descends, partially closing the discharge-opening, so that the amount of water discharged will be uniform.

With this construction, as the pumps F are operated intermittently by the irregular action of the wind, the water will accumulate in the tank E, so that as it is discharged it may drive the wheel A when the wind is not blowing. Any desired number of pumps F and wind-wheels may be used—from one to fifty, or more.

The size of the tanks E D must depend upon the size of the wheel to be used and the amount of work to be done. With the tank E, near its bottom, is connected the end of a hose, N, the other end of which is connected with the bottom of a bucket, O, placed in a suitable receptacle at the side of the upper part of the tank E. With this construction, as the water rises in the tank E it also rises in the hose N and bucket O, and thus increases the weight of the said bucket.

To the bucket O is attached the end of a rope, P, the other end of which is designed to be connected with the weight-lever of the wind-wheel, so that when the bucket O becomes heavy by the inflow of water it may move downward, and thus operate the said lever to throw the wheel out of the wind, and thus stop the action of the pumps, to prevent the tank E from overflowing.

When the water is lowered in the tank E and in the bucket O to a certain point, the bucket O becomes light, and ascends and starts the wind-wheel automatically.

The tanks E and D may be made of any suitable material. In cases where there is a suitable fall they may be made in the ground. This is especially advantageous when there are springs which can be connected with the upper tanks for the double purpose of supplying the water lost by evaporation and furnishing water to drive the wheel, giving the pumps less work to do.

With an apparatus thus constructed any desired amount of machinery may be driven, with the advantage that there are no steam-boilers to explode, and with a much less supply of water than would be necessary were the water-power applied in the usual way, there being no waste of water except by evaporation, the same water being used over and over again.

Having thus fully described my invention, I claim as new and desire to secure by Letters Patent—

The combination of wheel A on shaft B, the tanks D E, and the wind-pumps F, the tank E being provided with gates H J, operating as and for the purpose specified.

MARTIN EVERHART.

Witnesses:
JEREMIAH MARKLEE,
WILLIAM McCLOSKEY.